(12) United States Patent
Wang

(10) Patent No.: US 7,714,677 B2
(45) Date of Patent: May 11, 2010

(54) SIGNAL ADJUSTER

(75) Inventor: Chang-Pin Wang, Yung-Ho (TW)

(73) Assignee: Sure-Fire Electrical Corporation, Taipei Hsien (TW)

( * ) Notice: Subject to any disclaimer, the term of this patent is extended or adjusted under 35 U.S.C. 154(b) by 50 days.

(21) Appl. No.: 12/259,300

(22) Filed: Oct. 28, 2008

(65) Prior Publication Data

US 2009/0051812 A1 Feb. 26, 2009

Related U.S. Application Data

(63) Continuation-in-part of application No. 11/163,092, filed on Oct. 5, 2005, now abandoned.

(51) Int. Cl.
 *H04L 25/03* (2006.01)
(52) U.S. Cl. .................................... 333/28 R; 348/571

(58) Field of Classification Search ............... 333/28 R, 333/18
See application file for complete search history.

(56) References Cited

U.S. PATENT DOCUMENTS

2007/0242742 A1 * 10/2007 Biman et al. ................ 375/233

* cited by examiner

*Primary Examiner*—Stephen E Jones

(57) ABSTRACT

A signal adjuster is disclosed to include a first connector and a second connector respectively connected to a signal source and a video display device, a buffer for buffering a high frequency signal, a signal bandwidth detector connected to the buffer for detecting the continuation condition of the high frequency signal, an adjustable equalizer connected between the buffer and the second connector and connected with the signal bandwidth detector for actively adjusting signal strength of the high frequency signal subject to the detection of the signal bandwidth detector, an amplifier for amplifying the enhanced high frequency signal from the adjustable equalizer, and a driver for driving the second connector to output the amplified high frequency signal from the amplifier to the video display device.

8 Claims, 3 Drawing Sheets

SIGNAL ADJUSTER

This application is a Continuation-In-Part of my patent application, Ser. No. 11/163,092, filed on Oct. 5, 2005.

BACKGROUND OF THE INVENTION

1. Field of the Invention

The present invention relates to signal adjuster and more particularly, to a signal adjuster for connection between a signal source and a video display device through a high frequency signal cable to enhance the strength of the transmitting high frequency signal by means of an adjustable equalizer subject to the detection of a signal bandwidth detector.

2. Description of the Related Art

In recent years, there is a great change in audio and video application industry. In consequence, a variety of audio and video devices have been developed and intensively used in our daily life. These audio and video devices including CD/VCD/DVD players, high resolution digital TVs, video phones and videoconference systems commonly use a digitalized technology to process audio signal in video signal. Following different application requirements, related protocols have been well defined. For example, DVI (Digital Video Interface) is a connection standard for connection between a display card system and a display device, for particularly, a digital display device. A DVI display card system comprises a transmitter and a receiver. The transmitter can be built in the display card system. DVI is established subject to TMDS (Transition Minimized Differential Signaling) protocol, i.e., PanelLink technology that supports VGA to QXGA (2048× 1536) resolution, has the pulse speed of 25~165 MHz. The bandwidth can reach 1.65 Gbps during transmission under one single channel link, or over 2 Gbps during transmission under two channel links. TMDS allows transmission of digital signal, therefore it is connectable to a conventional CRT monitor.

Early analog TVs adopt analog signal only. Analog signal uses a low frequency as the transmission interface. Low frequency allows transmission of only one signal at a time. The picture quality of an analog TV is less clear. In recent years, digital TVs have been intensively used to substitute for conventional analog TVs. A digital TV accepts transmission of multiple image signals at a time. For transmission of a big amount of video data, a digital TV uses a high-frequency interface for signal transmission. This high-frequency interface is used an application of HDMI (High Definition Multimedia Interface) cable that provides an uncompressed digital link between consumer electronics equipment such as DVD players, set-top boxes and audio/video monitors such as plasma display screens for HDTV's. HDMI supports standard, enhanced, or high-definition video, plus multi-channel digital audio on a signal cable. It transmits all ATSC HDTV standards and supports 4-channel digital audio, with bandwidth to spare to accommodate future enhancements and requirements.

However, when multiple users share one single high frequency signal cable through a router and there is a long distance between transmitter side and receiver side, the signal will be attenuated following the increasing of the distance between the transmitter side and the receiver side, and the images will be interfered with noises. Due to this drawback, a high-frequency interface may be not usable in certain fields. Further, in order to eliminate noises during transmission of a signal to a digital TV through the cable, a signal adjuster may be attached to the transmitter side or the receiver side to enhance the signal.

Although many new video signal transmission interface means have been continuously developing, there is still a limitation to the effective transmission distance. The use of a conventional signal adjuster in a high frequency signal cable still cannot allow a great extension of the length of the high frequency signal cable.

SUMMARY OF THE INVENTION

The present invention has been accomplished under the circumstances in view. It is the main object of the present invention to provide a signal adjuster which actively adjusts the strength of the high frequency signal transmitting from a signal source to a video display device subject to the detection of a signal bandwidth detector, allowing extension of the high frequency signal cable between the signal source and the video display device.

To achieve this and other objects of the present invention, the signal adjuster comprises at least one first connector electrically connected to a respective signal source through a high frequency signal cable for receiving a high frequency signal from the respective signal source; a second connector electrically connected a video display device for output of a high frequency signal to the video display device; a buffer electrically connected in series between the first connector and the second connector for storing a high frequency signal temporarily and transmitting the high frequency signal to the second connector, a signal bandwidth detector electrically connected to the buffer and adapted to detect the continuation condition of a high frequency signal being transmitted from one the first connector to the buffer; an adjustable equalizer electrically connected in series between the buffer and the second connector and electrically connected with the signal bandwidth detector and adapted to actively adjust the strength of a high frequency signal being transmitted from the buffer to the second connector subject to the detection of the signal bandwidth detector, an amplifier electrically connected in series between the adjustable equalizer and the second connector and adapted to amplify a high frequency signal being transmitted from the buffer to the second connector through the adjustable equalizer, and a driver electrically connected in series between the amplifier and the second connector for driving the second connector to output a high frequency signal being transmitted through the amplifier to the video display device.

DETAILED DESCRIPTION OF THE PREFERRED EMBODIMENT

Figure 1:
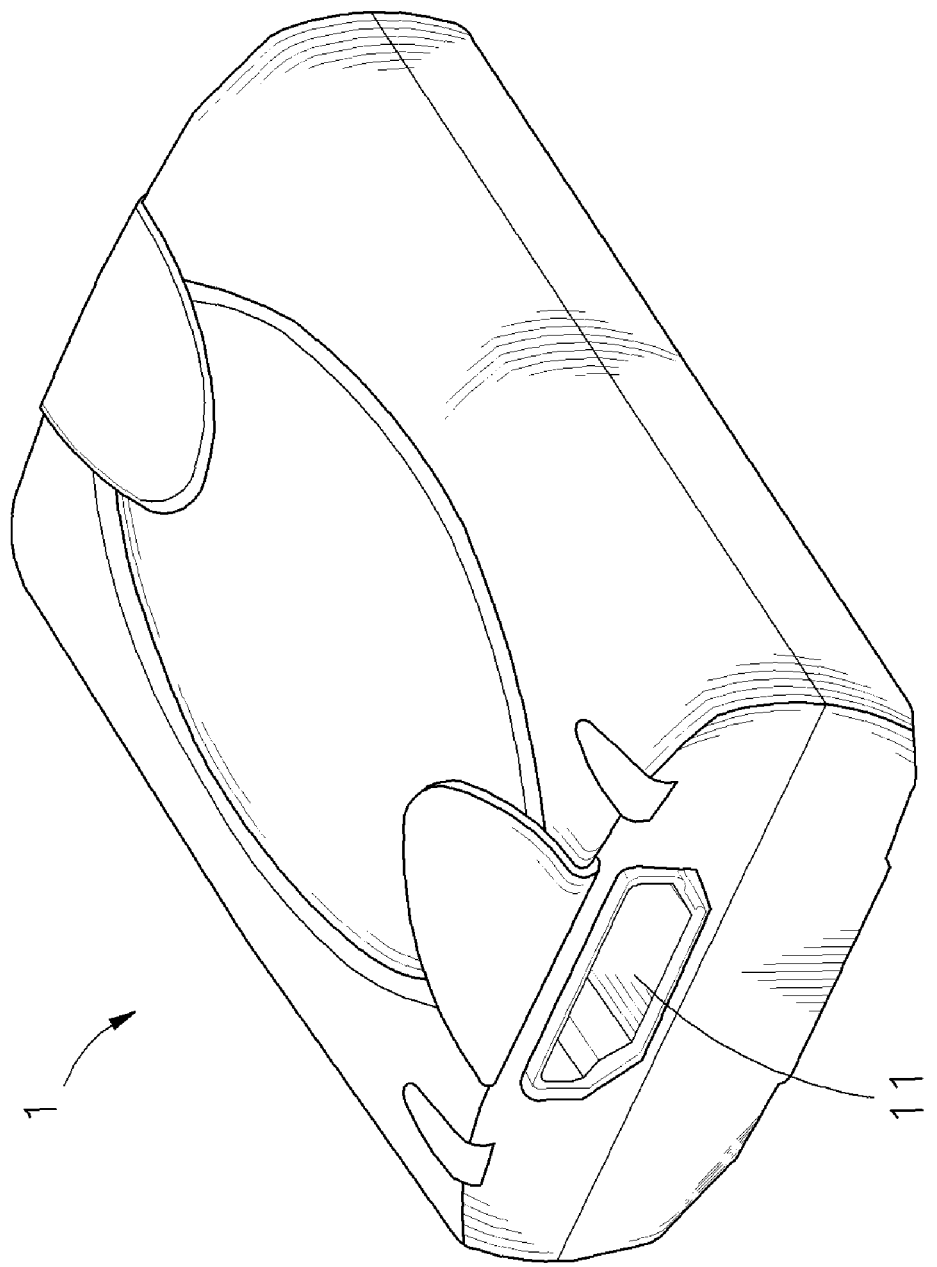
FIG. 1 is an elevational view of a signal adjuster according to the present invention.
Figure 2:
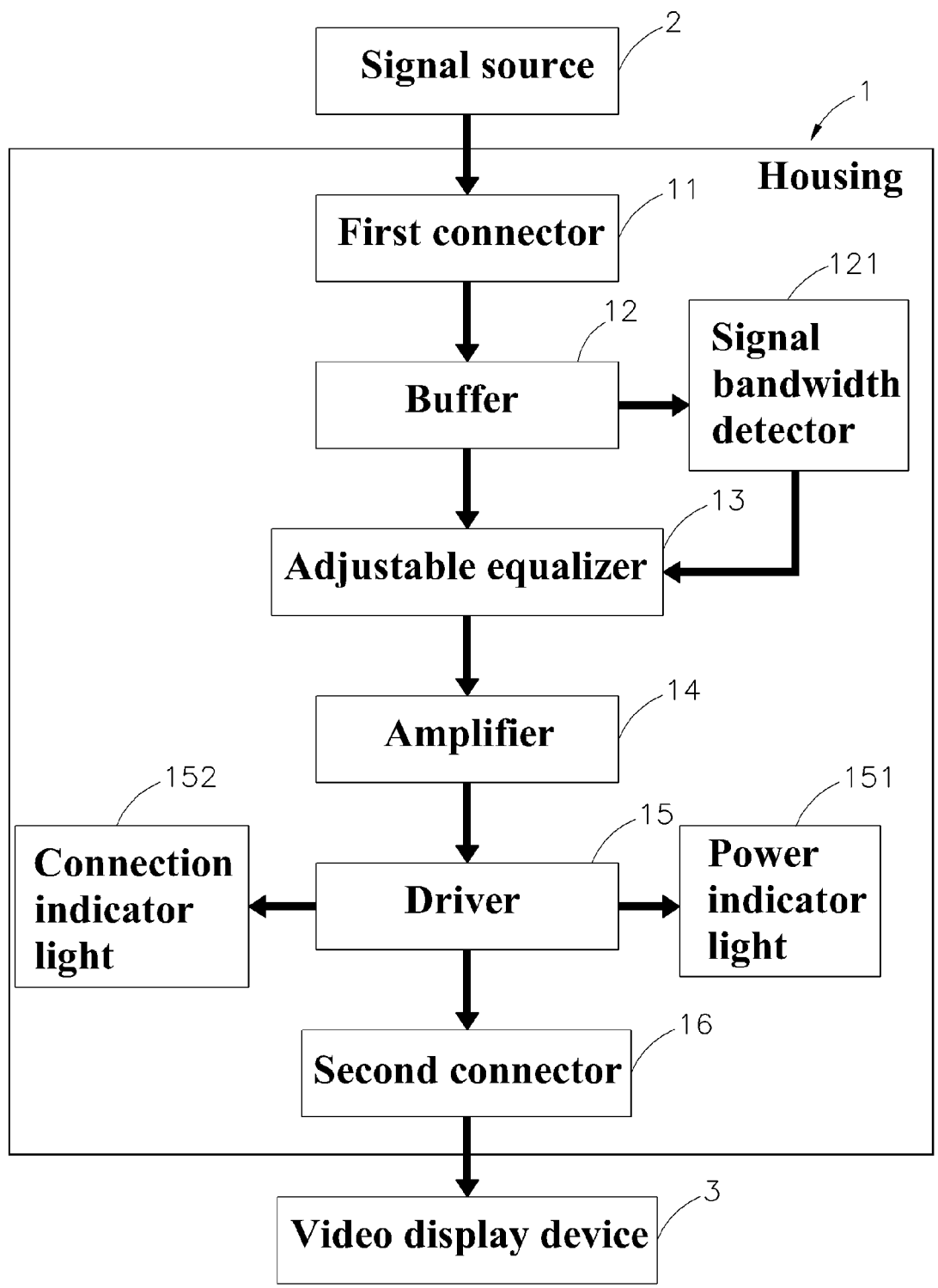
FIG. 2 is a system block diagram of the signal adjuster according to the present invention.

Referring to FIGS. 1 and 2, a signal adjuster is shown comprising a first connector 11, a buffer 12, an adjustable equalizer 13, an amplifier 14, a driver 15 and a second connector 16. These component parts 11~16 are housed in an electrically insulative housing 1.

The first connector 11 is adapted to receive a high frequency signal from a signal source (transmitter side) 2.

The buffer 12 is electrically connected to an output end of the first connector 11, and adapted for temporarily storing the high frequency signal received from the first connector 11.

The buffer 12 has connected thereto a signal bandwidth detector 121 for detecting the bandwidth of the high frequency signal transmitting through the buffer 12 actively.

The adjustable equalizer 13 is electrically connected to an output end of the buffer 12 and the signal bandwidth detector 121, and adapted to adjust the strength of the high frequency signal transmitting through the buffer 12 actively.

The amplifier 14 according to this embodiment is an operation amplifier electrically connected to an output end of the adjustable equalizer 13, and adapted to amplify the high frequency signal transmitting through the adjustable equalizer 13.

The driver 15 is electrically connected to an output end of the amplifier 14 and adapted to receive the high frequency signal from the amplifier 14, having connected thereto a power indicator light 151 and a connection indicator light 152.

The second connector 16 is electrically connected to the driver 15 and adapted to receive the high frequency signal from the driver 15 and to output the high frequency signal to a video display device 3. The video display 3 can be a LCD TV or computer monitor.

Figure 3:
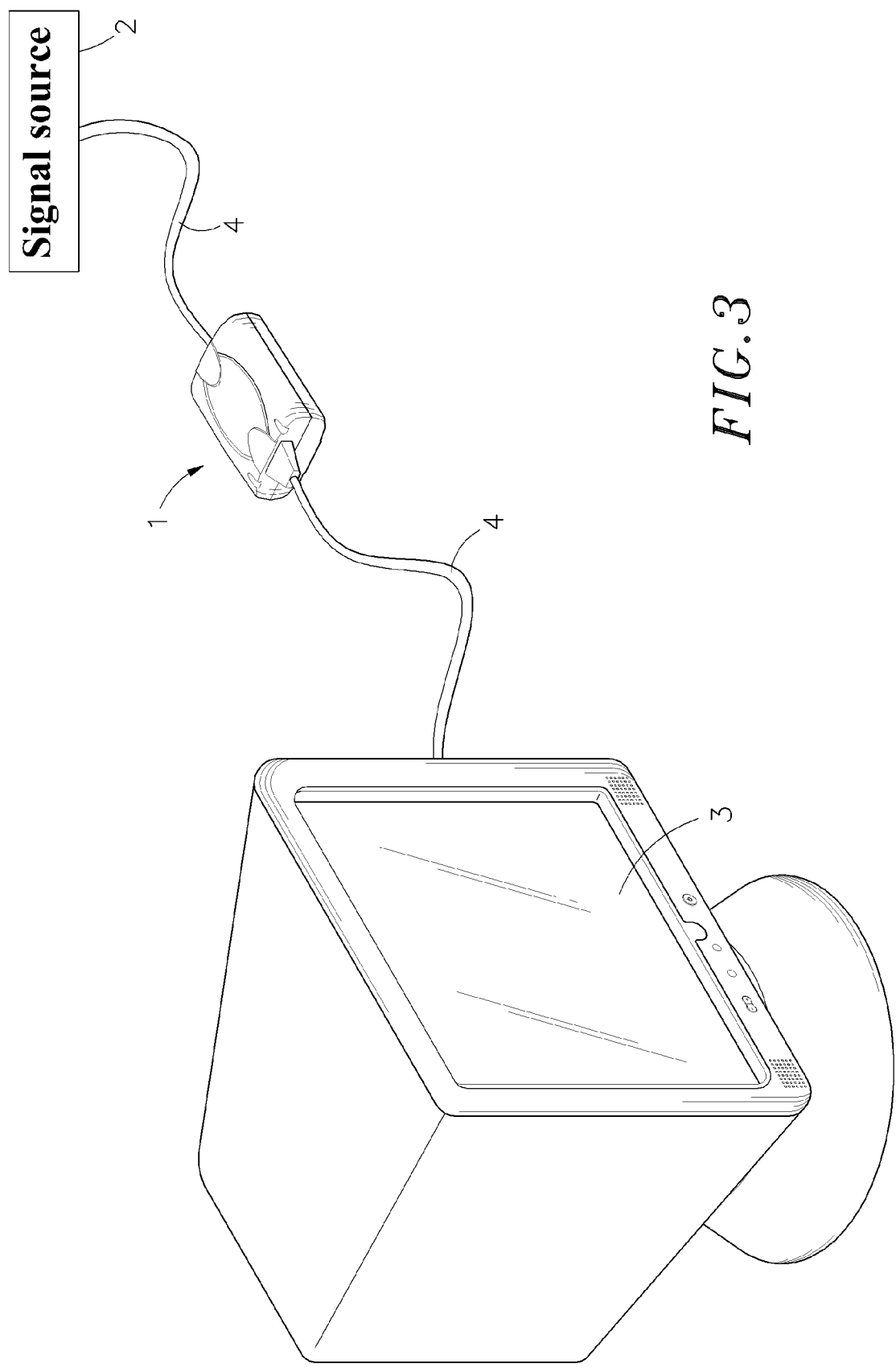
FIG. 3 is an applied view of the present invention.

Referring to FIG. 3 and FIG. 2 again, when switched on power supply after connection of the signal adjuster and an electronic product for transmitting a high frequency signal, the power indicator light 151 is turned on, and electric current is provided to the signal adjuster. After connection of the first connector 11 and the second connector 16 of the signal adjuster to the signal source 2 and the video display device 3 by a respective high frequency signal cable 4, the connection indicator light 152 is turned on. When the signal source 2 outputs a high frequency signal to the first connector 11, the first connector 11 transmits the high frequency signal to the buffer 12, which temporarily stores this high frequency signal and then transmits it to the adjustable equalizer 13 and the signal bandwidth detector 121. At this time, the signal bandwidth detector 121 automatically detects the bandwidth of the high frequency signal and sends a detection result to the adjustable equalizer 13. Subject to the detection result from the signal bandwidth detector 121, the adjustable equalizer 13 performs frequency enhancing and filtering works on the high frequency signal and then sends the processed high frequency signal to the amplifier 14 for amplification. The amplifier 14 sends the amplified high frequency signal to the driver 15, which drives the second connector 16 to transmit the amplified high frequency signal to the video display device 3 for output. Therefore, the use of the signal adjuster actively enhances the strength of the high frequency signal, allowing extension of the distance between the signal source 2 and the video display device 3.

The aforesaid high frequency signal is composed of a series of digits of 0 and 1. When transmitted through a long distance, the high frequency signal may be attenuated, showing a series of digits of 0 or 1. By means of the application of the signal adjuster according to the present invention, this signal attenuation problem is eliminated.

Upon receipt of the high frequency signal by the buffer 12, the signal bandwidth detector 121 detects the continuation condition of the high frequency signal by means of using two different frequencies to put, at the first null, the data of 3.2 GHz into the formula: $\text{sinc}^2(T_b \cdot f_1)/\text{sinc}^2(T_b \cdot f_2)$, in which sinc: function of high frequency signal; $f_1$ and $f_2$: frequency (MHz); $T_b$: bit period.

Through the aforesaid formula, an expected specific value is calculated to be 1.1. The data of the high frequency signal is putted into the formula, obtaining a measured specific value. The expected specific value is compared with the measured specific value to obtain a ratio. The ratio thus obtained is transmitted, in the form of a signal, to the adjustable equalizer 13, enabling the adjustable equalizer 13 to adjust the high frequency signal subject to the ratio obtained, actively changing the skin effect and compensating gain of the power of the high frequency signal transmitted through the buffer 12. Therefore, by means of active compensation through the adjustable equalizer 13, the signal attenuation problem due to a long distance transmission is eliminated, avoiding display problems of noise interference, trembling of images or mottling in the video display device 3.

As indicated above, the invention provides a signal adjuster installed in between a signal source and a video display device to actively enhance the strength of the high frequency signal outputted by the signal source to the video display device. The position of the signal adjuster can be adjusted subject to the length of the high frequency signal cable between the signal source and the video display device. Subject to the detection of the bandwidth of the high frequency signal being transmitted from the signal source to the video display device by the signal bandwidth detector, the adjustable equalizer actively adjusts the signal strength of the high frequency signal, avoiding signal attenuation.

Although a particular embodiment of the invention has been described in detail for purposes of illustration, various modifications and enhancements may be made without departing from the spirit and scope of the invention.

What the invention claimed is:

1. A signal adjuster comprising:
   at least one first connector electrically connected to a respective signal source through a high frequency signal cable for receiving a high frequency signal from said respective signal source;
   a second connector electrically connected a video display device for output of a high frequency signal to said video display device;
   a buffer electrically connected in series between said first connector and said second connector for storing a high frequency signal temporarily and transmitting the high-frequency signal to said second connector,
   a signal bandwidth detector electrically connected to said buffer and adapted to detect the continuation condition of a high frequency signal being transmitted from one said first connector to said buffer;
   an adjustable equalizer electrically connected in series between said buffer and said second connector and electrically connected with said signal bandwidth detector and adapted to actively adjust the strength of a high frequency signal being transmitted from said buffer to said second connector subject to the detection of said signal bandwidth detector;
   an amplifier electrically connected in series between said adjustable equalizer and said second connector and adapted to amplify a high frequency signal being transmitted from said buffer to said second connector through said adjustable equalizer; and
   a driver electrically connected in series between said amplifier and said second connector for driving said second connector to output a high frequency signal being transmitted through said amplifier to said video display device.

2. The signal adjuster as claimed in claim 1, wherein said video display device is a LCD TV.

3. The signal adjuster as claimed in claim 1, wherein said video display device is a computer monitor.

4. The signal adjuster as claimed in claim 1, wherein said amplifier is an operation amplifier.

5. The signal adjuster as claimed in claim 1, wherein said driver has a power indicator light and a connection indicator light electrically connected thereto for power supply status indication and signal adjuster connection status indication.

6. The signal adjuster as claimed in claim 1, wherein said signal bandwidth detector detects the continuation condition of a high frequency signal by means of using two different frequencies to put, at the first null, the data of 3.2 GHz into a formula to obtain a measured specific value and then comparing said measured specific value with an expected specific value so as to obtain a ratio and then transmitting said ratio to said adjustable equalizer in the form of a signal.

7. The signal adjuster as claimed in claim 6, wherein said adjustable equalizer adjusts the high frequency signal being transmitted through said buffer subject to said ratio obtained, actively changing the skin effect and compensating gain of the power of the high frequency signal.

8. The signal adjuster as claimed in claim 6, wherein said formula is $\mathrm{sinc}^2(T_b \cdot f_1)/\mathrm{sinc}^2(T_b \cdot f_2)$, in which sinc is the function of the high frequency signal; $f_1$ and $f_2$ are the frequency (MHz); $T_b$ is the bit period.

* * * * *